(12) United States Patent
Wang (10) Patent No.: US 10,381,670 B2
(45) Date of Patent: Aug. 13, 2019

(54) HYDROGEN PRODUCTION SYSTEM

(71) Applicant: M-FIELD ENERGY LTD., Zhudong Township, Hsinchu County (TW)

(72) Inventor: Fu-Cheng Wang, Zhudong Township (TW)

(73) Assignee: M-Field Energy Ltd., Zhudong Township (TW)

( * ) Notice: Subject to any disclaimer, the term of this patent is extended or adjusted under 35 U.S.C. 154(b) by 89 days.

(21) Appl. No.: 15/851,967

(22) Filed: Dec. 22, 2017

(65) Prior Publication Data

US 2019/0131643 A1 May 2, 2019

(30) Foreign Application Priority Data

Oct. 31, 2017 (TW) .............................. 106137593 A (51) Int. Cl.
| | |
|---|---|
| *H01M 8/065* | (2016.01) |
| *H01M 8/04746* | (2016.01) |
| *H01M 8/0438* | (2016.01) |
| *B01J 7/02* | (2006.01) |
| *C01B 3/06* | (2006.01) |
| *H01M 8/04082* | (2016.01) |

(52) U.S. Cl.
CPC ............... *H01M 8/065* (2013.01); *B01J 7/02* (2013.01); *C01B 3/065* (2013.01); *H01M 8/04201* (2013.01); *H01M 8/04388* (2013.01); *H01M 8/04753* (2013.01); *H01M 2250/20* (2013.01)

(58) Field of Classification Search
CPC ............ H01M 8/065; H01M 8/04201; H01M 8/04388; H01M 8/04753; B01J 7/02; C01B 3/065
See application file for complete search history.

(56) References Cited

U.S. PATENT DOCUMENTS 6,526,950 B2 * 3/2003 Ito ........................ F02M 25/089
123/518
6,536,551 B1 * 3/2003 Tanaka ................... B60K 28/14
180/271

* cited by examiner

*Primary Examiner* — Helen Oi K Conley
(74) *Attorney, Agent, or Firm* — Alan D. Kamrath; Mayer & Williams PC (57) ABSTRACT

A hydrogen production system has an automatic feeding device connected to a buffer tank, and a first valve controlling hydrogen-producing materials to be fed into the buffer tank or not. The buffer tank connects to a main reactor, and the hydrogen-producing materials in the buffer tank are controlled by a second valve to be fed into the main reactor or not. The main reactor connects to a hydrogen storing tank. A one-way check valve is mounted between the main reactor and the hydrogen storing tank to avoid hydrogen in the hydrogen storing tank flowing back to the main reactor. The hydrogen-producing materials in the main reactor undergo a chemical reaction to produce the hydrogen, and the hydrogen storing tank stores the hydrogen to provide fuel of a fuel cell for reducing transporting cost of the hydrogen and for enhancing safety of storing the hydrogen.

10 Claims, 4 Drawing Sheets

HYDROGEN PRODUCTION SYSTEM

CROSS-REFERENCE TO RELATED APPLICATIONS

This application claims the priority benefit of TW application serial No. 106137593, filed on Oct. 31, 2017. The entirety of the above-mentioned patent application is hereby incorporated by reference herein and made a part of specification.

BACKGROUND OF THE INVENTION

1. Field of the Invention

The present invention relates to a gas production system, and more particularly to a hydrogen production system.

2. Description of the Related Art

Since the industrialization era, most countries in the world have gradually entered the phase of the developed countries. However, the higher the degree of industrialization, the more the resources consumed. Hence, the petrochemical energy is rapidly consumed and looking for alternative energy has become an issue with which all countries are highly concerned. The alternative energy that may potentially replace the petrochemical energy includes nuclear energy, solar energy, wind energy, geothermal energy, tidal energy, or hydrogen energy. In the meanwhile efforts have been put into developments of products that are driven by the alternative energy, such as automobiles.

Normally, automobiles use four kinds of energies as the power source, such as petrochemical power, hybrid power, battery power, or fuel cell power. The fuel cell power is electrical power generated through a chemical reaction of hydrogen. The chemical reaction of hydrogen has advantages of high energy conversion efficiency and zero pollution.

The hydrogen needs to be stored in a high-pressure cylinder during the course of transporting. In consideration of storage and transporting safety of the high pressure cylinder, cost for transporting the high pressure cylinder is high. Further, gas stations that supply hydrogen need to be deployed at multiple locations, so automobiles using fuel cell power as the power source can be conveniently refueled at any one of the gas stations that supply hydrogen. However, hydrogen is not easily stored in the gas stations, and therefore the fuel cell power is difficult to be promoted to the general public.

SUMMARY OF THE INVENTION

An objective of the present invention is to provide a hydrogen production system. The hydrogen production system has a simple structure and can be easily mounted. Further, the hydrogen production system can automatically feed raw material for producing hydrogen. Therefore, the complexity of transporting hydrogen can be ignored, and high pressure cylinders may not need to be prepared. Cost for transporting hydrogen can be decreased, and safety for using hydrogen can be enhanced.

The hydrogen production system includes an automatic feeding device, a buffer tank, a first valve, a main reactor, a second valve, a hydrogen storing tank, and a one-way check valve. The automatic feeding device is configured to provide hydrogen-producing materials and to output the hydrogen-producing materials.

The buffer tank is configured to be connected to the automatic feeding device through a first tube.

The first valve is configured to be mounted on the first tube and to receive a first controlling signal from a controlling device. The first valve is turned on or turned off according to the first controlling signal to control whether the hydrogen-producing materials in the automatic feeding device are transported to the buffer tank or not.

The main reactor is configured to be connected to the buffer tank through a second tube. The main reactor contains catalyst materials.

The second valve is configured to be mounted on the second tube and to receive a second controlling signal from the controlling device. The second valve is turned on or turned off according to the second controlling signal to control whether the hydrogen-producing materials in the buffer tank are transported to the main reactor or not. When the hydrogen-producing materials in the buffer tank enter the main reactor, the hydrogen-producing materials and the catalyst materials undergo a chemical reaction to produce hydrogen.

The hydrogen storing tank is configured to be connected to the main reactor through a third tube to store the hydrogen.

The one-way check valve is configured to be mounted on the third tube and to receive a third controlling signal from the controlling device. The one-way check valve is turned on or turned off according to the third controlling signal to control whether the hydrogen in the main reactor is transported to the hydrogen storing tank or not.

The hydrogen production system may contain the hydrogen-producing materials, and output the hydrogen-producing materials from the buffer tank to the main reactor to undergo a chemical reaction to produce hydrogen by automatic feeding. Further, the hydrogen may be stored in the hydrogen storing tank. Therefore, a user only needs to transport raw materials for producing the hydrogen, the user does not need to transport the high pressure cylinders containing the hydrogen and thus does not have to worry about storage and transporting safety of high pressure cylinders. Hence, transport cost of hydrogen may be decreased, and safety of storing hydrogen may be enhanced.

Further, the hydrogen production system has an advantage of small size, and may be easily set up. Therefore, the hydrogen production system may be directly mounted on a vehicle or at other positions for easily producing hydrogen. Hydrogen does not need to be stored in the high pressure cylinder for transporting.

Other objectives, advantages and novel features of the invention will become more apparent from the following detailed description when taken in conjunction with the accompanying drawings.

DETAILED DESCRIPTION OF THE INVENTION

Figure 1:
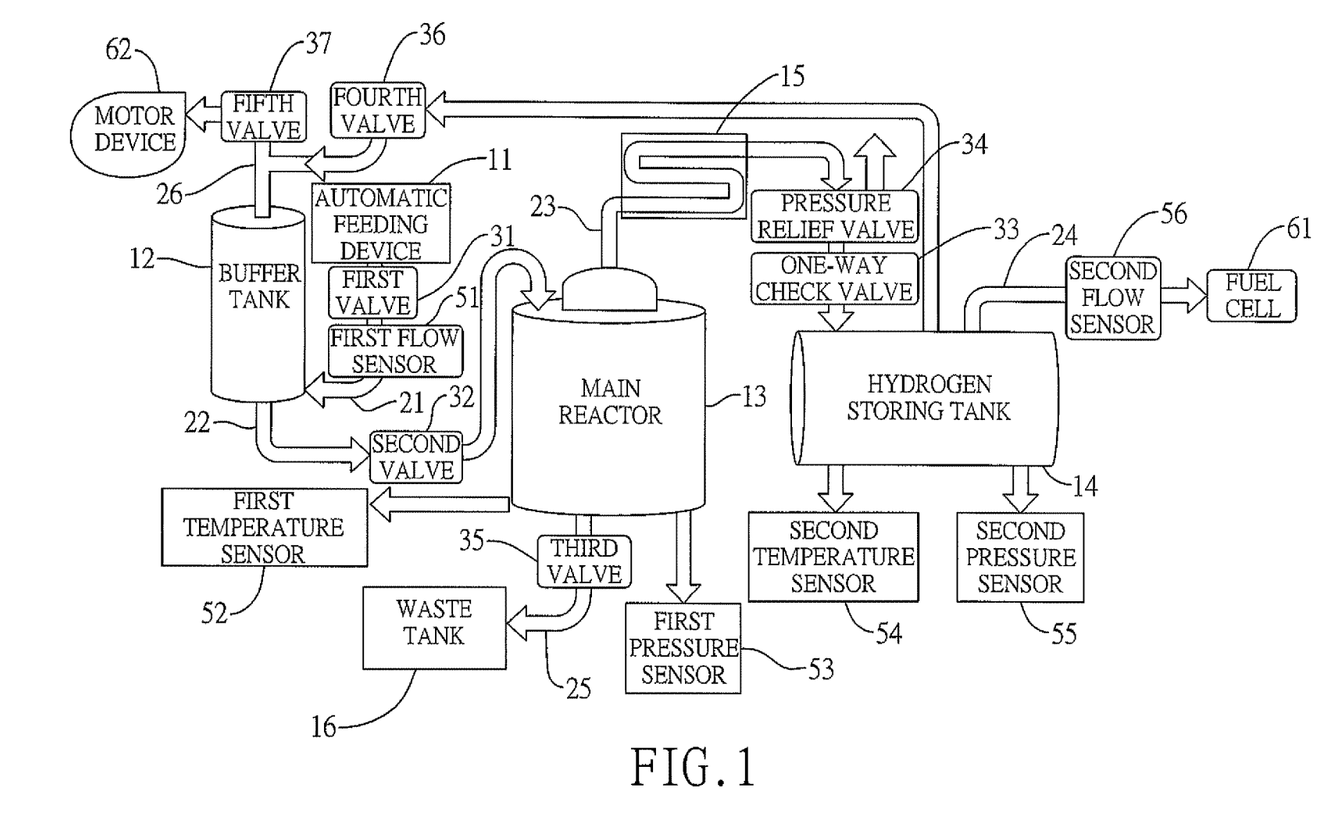
FIG. 1 is a system block diagram of an embodiment of a hydrogen production system of the present invention.
Figure 2:
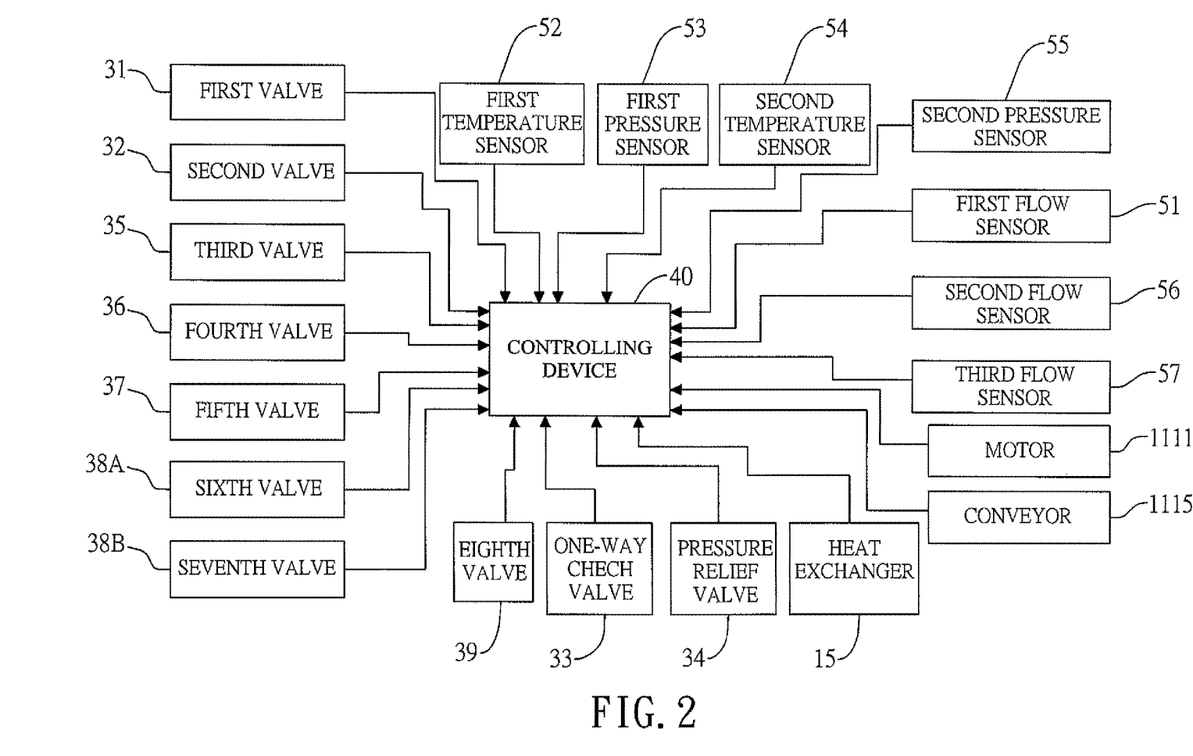
FIG. 2 is anther system block diagram of an embodiment of a hydrogen production system of the present invention.

With reference to FIGS. 1 and 2, the present invention is a hydrogen production system. The hydrogen production system includes an automatic feeding device 11, a buffer tank 12, a main reactor 13, a hydrogen storing tank 14, a first tube 21, a second tube 22, a third tube 23, a first valve 31, a second valve 32, and a one-way check valve 33. In the embodiment, the first valve 31, the second valve 32, and the one-way check valve 33 are each a solenoid valve, and are electrically connected to a controlling device 40.

The automatic feeding device 11 is connected to the buffer tank 12 through the first tube 21, and the first valve 31 is mounted on the first tube 21. The automatic feeding device 11 provides hydrogen-producing materials and automatically feeds the hydrogen-producing materials to the buffer tank 12. The hydrogen-producing materials are liquid, i.e. a solution of sodium borohydride dissolved in water. Therefore, the hydrogen-producing materials are not in a gaseous state.

The first valve 31 receives a first controlling signal from the controlling device 40, and is turned on or turned off according to the first controlling signal to control whether the hydrogen-producing materials in the automatic feeding device 11 are transported to the buffer tank 12 or not. When the first valve 31 is turned on according to the first controlling signal, the hydrogen-producing materials in the automatic feeding device 11 enter the buffer tank 12, and the controlling device 40 further outputs another first controlling signal to control the first valve 31 to be turned off.

Further, the first tube 21 includes a first flow sensor 51 mounted on the first tube 21, and the first flow sensor 51 is electrically connected to the controlling device 40. The first flow sensor 51 monitors a flow rate of the hydrogen-producing materials flowing from the automatic feeding device 11 to the buffer tank 12, and transmits a first flow rate signal to the controlling device 40. The controlling device 40 produces the first controlling signal to control the first valve 31 to be turned on or turned off according to the first flow rate signal.

The buffer tank 12 is connected to the main reactor 13 through the second tube 22 to feed the hydrogen-producing materials in the buffer tank 12 to the main reactor 13. The second valve 32 is mounted on the second tube 22. The second valve 32 receives a second controlling signal from the controlling device 40, and is turned on or turned off according to the second controlling signal to control whether the hydrogen-producing materials in the buffer tank 12 are transported to the main reactor 13 or not. When the second valve 32 is turned on according to the second controlling signal, the hydrogen-producing materials in the buffer tank 12 enter the main reactor 13, and the controlling device 40 further outputs another second controlling signal to control the second valve 32 to be turned off.

In the embodiment, the main reactor 13 contains catalyst materials. The catalyst materials includes cobalt materials and nickel materials. When the hydrogen-producing materials in the buffer tank 12 enter the main reactor 13, the hydrogen-producing materials and the catalyst materials undergo a chemical reaction to produce hydrogen.

When a state of the buffer tank 12 is a negative pressure state, the hydrogen-producing materials in the automatic feeding device 11 are sucked into the buffer tank 12. When the hydrogen-producing materials in the automatic feeding device 11 are sucked in the buffer tank 12, the state of the buffer tank 12 becomes a normal pressure state. Further, the buffer tank 12 inhales air to pressurize the hydrogen-producing materials, and the hydrogen-producing materials are pushed into the main reactor 13.

The main reactor 13 is connected to the hydrogen storing tank 14 through the third tube 23, and the hydrogen produced by the chemical reaction is contained in the hydrogen storing tank 14. The one-way check valve 33 is mounted on the third tube 23. The one-way check valve 33 receives a third controlling signal, and is turned on or turned off according to the third controlling signal to control whether the hydrogen in the main reactor 13 is transported to the hydrogen storing tank 14 or not.

When the one-way check valve 33 is turned on according to the third controlling signal, the hydrogen-producing materials in the main reactor 13 enter the hydrogen storing tank 14.

The one-way check valve 33 restricts the hydrogen to be delivered only to the hydrogen storing tank 14 from the main reactor 13, and restricts the hydrogen from being delivered to the main reactor 13 from the hydrogen storing tank 14. Therefore, the hydrogen may not flow back to the main reactor 13, thereby avoiding excessive pressure in the main reactor 13.

In the embodiment, the main reactor 13 further includes a first temperature sensor 52 and a first pressure sensor 53 which are mounted on the main reactor 13. The first temperature sensor 52 and the first pressure sensor 53 are respectively electrically connected to the controlling device 40. The first temperature sensor 52 senses a temperature inside of the main reactor 13, and transmits a first temperature signal to the controlling device 40 according to the temperature inside of the main reactor 13. The first pressure sensor 53 senses a pressure inside of the main reactor 13, and transmits a first pressure signal to the controlling device 40 according to the pressure inside of the main reactor 13.

The hydrogen storing tank 14 further includes a second temperature sensor 54 and a second pressure sensor 55 which are mounted on the hydrogen storing tank 14. The second temperature sensor 54 and the second pressure sensor 55 are respectively electrically connected to the controlling device 40. The second temperature sensor 54 senses a temperature inside of the hydrogen storing tank 14, and transmits a second temperature signal to the controlling device 40 according to the temperature inside of the hydrogen storing tank 14. The second pressure sensor 55 senses a pressure inside of the hydrogen storing tank 14, and transmits a second pressure signal to the controlling device 40 according to the pressure inside of the hydrogen storing tank 14.

In the embodiment, the third tube 23 further includes a pressure relief valve 34 mounted on the third tube 23. The pressure relief valve 34 is a solenoid valve, and is electrically connected to the controlling device 40. The controlling device 40 determines whether the pressure inside of the main reactor 13 reaches a first pressure threshold value according to the first pressure signal, and determines whether the pressure inside of the hydrogen storing tank 14 reaches a second pressure threshold value according to the second pressure signal. When the pressure inside of the main reactor 13 reaches the first pressure threshold value or the pressure inside of the hydrogen storing tank 14 reaches the second pressure threshold value, the controlling device 40 produces a fourth controlling signal, and outputs the fourth controlling signal to the pressure relief valve 34 to turn on the pressure relief valve 34 to release the pressure inside of the main reactor 13 or the pressure inside of the hydrogen storing tank 14.

In the embodiment, the third tube 23 further includes a heat exchanger 15 mounted on the third tube 23. The controlling device 40 determines whether the temperature inside of the main reactor 13 reaches a first temperature threshold value according to the first temperature signal, and determines whether the temperature inside of the hydrogen storing tank 14 reaches a second temperature threshold value according to the second temperature signal. When the temperature inside of the main reactor 13 reaches the first temperature threshold value or the temperature inside of the hydrogen storing tank 14 reaches the second temperature threshold value, the controlling device 40 controls the heat exchanger 15 to operate to reduce a temperature of the hydrogen flowing through the third tube 23.

In the embodiment, the hydrogen storing tank 14 is further connected to a fuel cell 61 through a fourth tube 24 to provide hydrogen to the fuel cell 61. Therefore, the fuel cell 61 converts the chemical energy from a hydrogen fuel into electricity. The fourth tube 24 includes a second flow sensor 56 mounted on the fourth tube 24, and the second flow sensor 56 is electrically connected to the controlling device 40. The second flow sensor 56 monitors a flow rate of the hydrogen flowing from the hydrogen storing tank 14 to the fuel cell 61, and transmits a second flow rate signal to the controlling device 40. Therefore, the controlling device 40 may determine a flow of the hydrogen flowing through the fourth tube 24.

In the embodiment, the main reactor 13 further connects to a waste tank 16 through a fifth tube 25. The fifth tube 25 includes a third valve 35 mounted on the fifth tube 25. The third valve 35 is a solenoid valve, and is electrically connected to the controlling device 40. The controlling device 40 may further produce a fifth controlling signal to control the third valve 35. When the third valve 35 receives the fifth controlling signal, the third valve 35 may be turned on, and waste water produced by the chemical reaction of producing the hydrogen may flow to the waste tank 16 through the third valve 35.

In the embodiment, the buffer tank 12 connects to a motor device 62 and the hydrogen storing tank 14 through a sixth tube 26. The sixth tube 26 is a tee pipe, and includes a fourth valve 36 and a fifth valve 37. The fourth valve 36 is mounted on a terminal of the sixth tube 26 connected to the hydrogen storing tank 14, and the fifth valve 37 is mounted on another terminal of the sixth tube 26 connected to the motor device 62. The fourth valve 36 and the fifth valve 37 are electrically connected to the controlling device 40.

When the controlling device 40 determines that the, pressure inside of the hydrogen storing tank 14 reaches a first setting value according to the second pressure signal, the controlling device 40 produces a sixth controlling signal. The controlling device 40 further transmits the sixth controlling signal to the fourth valve 36 to turn on the fourth valve 36, and hydrogen is delivered to the buffer tank 12 from the hydrogen storing tank 14. Further, the hydrogen-producing materials in the buffer tank 12 are pushed into the main reactor 13.

When the controlling device 40 determines that the pressure inside of the hydrogen storing tank 14 reaches a second setting value, the controlling device 40 produces a seventh controlling signal according to the second pressure signal. The controlling device 40 further transmits the seventh controlling signal to the fifth valve 37 to turn on the fifth valve 37, and hydrogen is delivered to the motor device 62 from the hydrogen storing tank 14 to push the motor device 62 for operation.

Figures 3, 4:
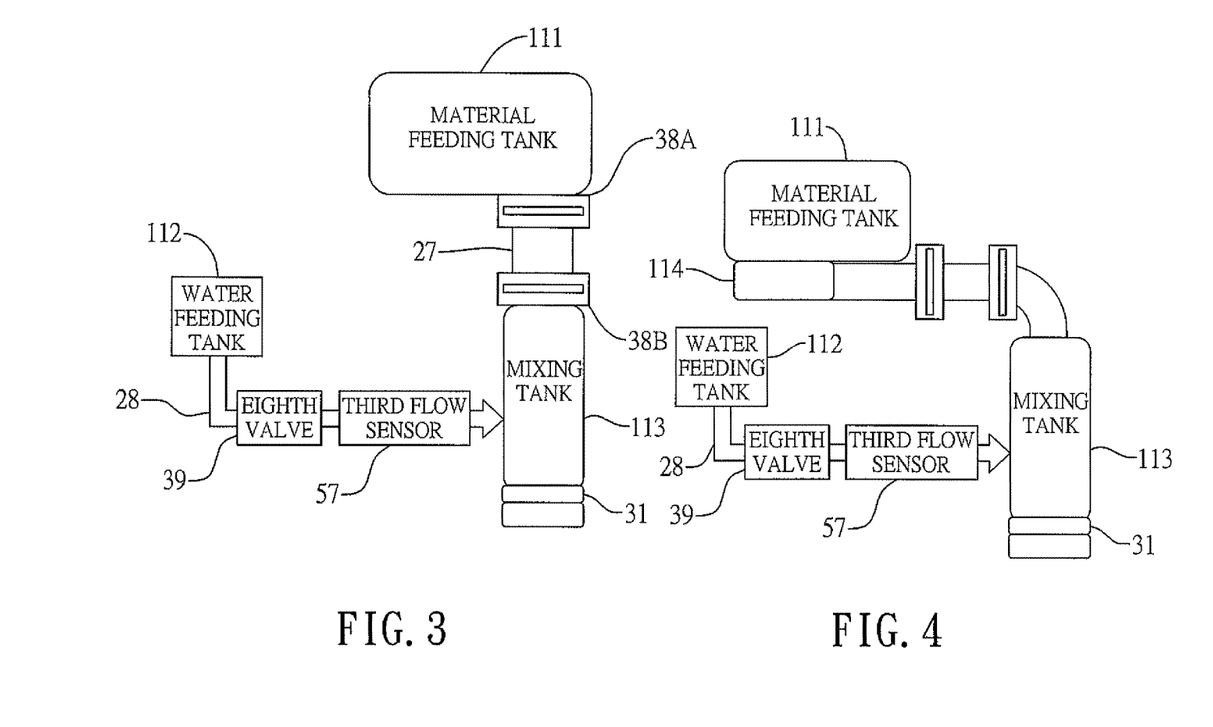
FIG. 3 is a schematic diagram of a first embodiment of an automatic feeding device of the hydrogen production system of the present invention.
FIG. 4 is a schematic diagram of a second embodiment of an automatic feeding device of the hydrogen production system of the present invention.

With reference to FIGS. 2 and 3, a first embodiment of the automatic feeding device 11 is provided. In the first embodiment of the automatic feeding device 11, the automatic feeding device II includes a material feeding tank 111, a water feeding tank 112, a mixing tank 113, a sixth valve 38A, a seventh valve 38B, an eighth valve 39, and a third flow sensor 57.

The material feeding tank 111 connects to the mixing tank 113 through a seventh tube 27. The material feeding tank 111 contains sodium borohydride powder. The sixth valve 38A is mounted on a terminal of the seventh tube 27 connected to the material feeding tank 111, and the seventh valve 38B is mounted on another terminal of the seventh tube 27 connected to the mixing tank 113. The mixing tank 113 further connects to the first valve 31. Namely, the mixing tank 113 connects to the buffer tank 12 through the first tube 21. The water feeding tank 112 connects to the mixing tank 113 through an eighth tube 28. The eighth valve 39 and the third flow sensor 57 are mounted on the eighth tube 28. The buffer tank 12 contains water.

The sixth valve 38A, the seventh valve 38B, and the eighth valve 39 are each a solenoid valve. The sixth valve 38A, the seventh valve 38B, the eighth valve 39, and the third flow sensor 57 are electrically connected to the controlling device 40.

When the sixth valve 38A is turned on according to an eighth controlling signal received from the controlling device 40, the sodium borohydride powder in the material feeding tank 111 may be fed into the seventh tube 27 and stopped by the seventh valve 38B. Therefore, the sodium borohydride powder may be located between the sixth valve 38A and the seventh valve 38B.

Further, the controlling device 40 transmits another eighth controlling signal to control the sixth valve 38A to be turned off. Then, the controlling device 40 transmits a ninth controlling signal to the seventh valve 38B to control the seventh valve 38B to be turned on. Hence, the sodium borohydride powder between the sixth valve 38A and the seventh valve 38B may be fed to the mixing tank 113.

Further, the controlling device 40 transmits a tenth controlling signal to the eighth valve 39 to control the eighth valve 39 to be turned on. Then, the water in the water feeding tank 112 may be fed to the mixing tank 113 to form the hydrogen-producing materials.

The third flow sensor 57 detects a flow rate of the water flowing from the water feeding tank 112 to the mixing tank 113, and transmits a third flow rate signal to the controlling device 40. When the controlling device 40 determines that a volume of the water fed into the mixing tank 113 reaches a predetermined value according to the third flow rate signal, the controlling device 40 controls the eighth valve 39 to be turned off.

In the embodiment, since the mixing tank 113 is above the first valve 31, the hydrogen-producing materials may flow out from the mixing tank 113 through the first valve 31 due to the gravity when the first valve 31 is turned on.

With reference to FIG. 4, a second embodiment of the automatic feeding device 11 is provided. The second embodiment of the automatic feeding device 11 is similar with the first embodiment of the automatic feeding device 11. The difference between the second embodiment and the first embodiment is that, in the second embodiment of the automatic feeding device 11, the automatic feeding device 11 further includes a push device 114. The push device 114 is mounted on the seventh tube 27, and pushes the sodium borohydride powder in the seventh tube 27 out of the seventh tube 27. In the embodiment, the seventh tube 27 is a piston.

Figure 5:
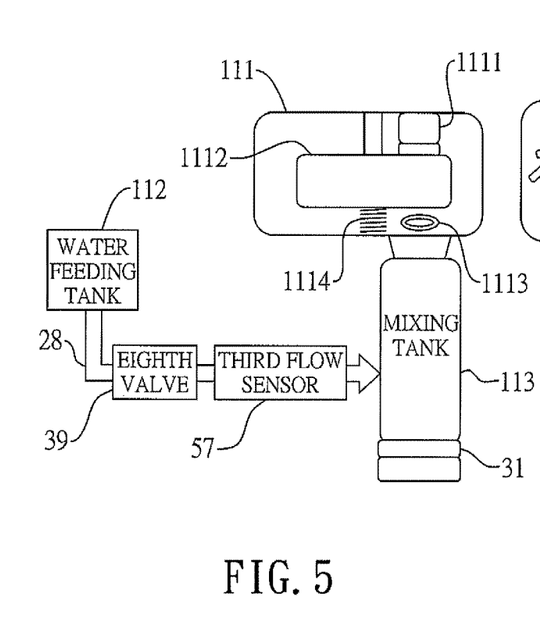
FIG. 5 is a schematic diagram of a third embodiment of an automatic feeding device of the hydrogen production system of the present invention.

With reference to FIGS. 2 and 5, a third embodiment of the automatic feeding device 11 is provided. The difference between the third embodiment and the first embodiment is the material feeding tank 111. In the third embodiment of the automatic feeding device 11, the material feeding tank 111 does not include the sixth valve 38A, the seventh valve 38B, and the seventh tube 27.

In the third embodiment of the automatic feeding device 11, the material feeding tank 111 includes a motor 1111, a revolver 1112, a blade 1113, and a spring 1114. The spring 1114 is a cushion of the revolver 1112. The motor 111I is electrically connected to the controlling device 40, and is controlled by the controlling device 40 to drive the revolver 1112 to rotate. When the revolver 1112 is rotated, the sodium borohydride powder in the revolver 1112 may sequentially fall from the revolver 1112 to the blade 1113. Then, the sodium borohydride powder may be cut into fine powder, and may fall from the blade 1113 to the mixing tank 113. In the embodiment, the material feeding tank 111 is a linear voice coil motor.

Figure 6:
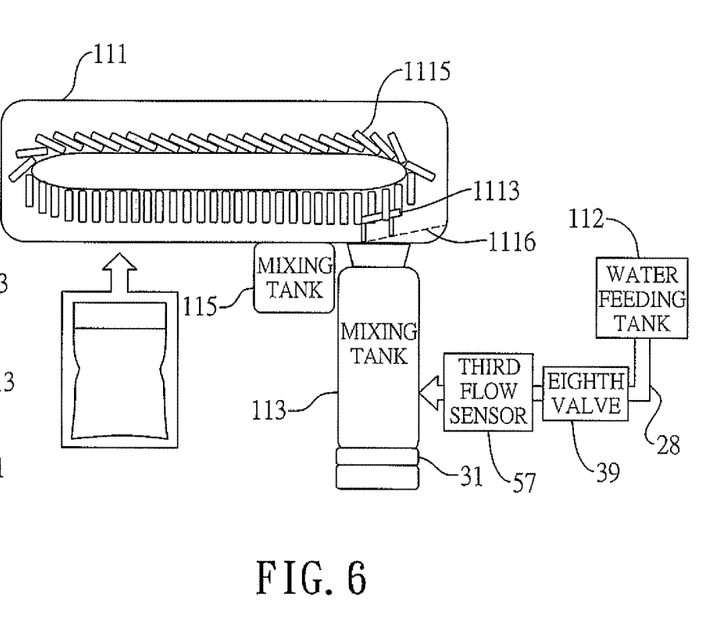
FIG. 6 is a schematic diagram of a fourth embodiment of an automatic feeding device of the hydrogen production system of the present invention.

With reference to FIG. 6, a fourth embodiment of the automatic feeding device 11 is provided. The fourth embodiment of the automatic feeding device 11 is similar with the third embodiment of the automatic feeding device 11. The difference between the fourth embodiment and the third embodiment is the material feeding tank 111. In the third embodiment of the automatic feeding device 11, the material feeding tank 111 includes a recycle tank 115. The recycle tank 115 is mounted on the material feeding tank 111.

The material feeding tank 111 includes a conveyor 1115. The conveyor 1115 is electrically connected to the controlling device 40, and is controlled by the controlling device 40 to convey the sodium borohydride powder to the blade 1113. The sodium borohydride powder may be cut into the fine powder by the blade 1113, and may fall from the blade 1113 to the mixing tank 113 through a sieve 1116. Large particles of the sodium borohydride powder may be sieved out and recycled into the recycle tank 115.

The automatic feeding device 11 contains the hydrogen-producing materials and automatically feeds the hydrogen-producing materials to the water feeding tank 112. The water feeding tank 112 further feeds the hydrogen-producing materials to the main reactor 13. Therefore, the hydrogen-producing materials in the main reactor 13 may undergo the chemical reaction to produce hydrogen. The hydrogen may further be output to the hydrogen storing tank 14. Therefore, hydrogen may be produced by automatic feeding.

Since the sodium borohydride powder is in the solid state, the sodium borohydride powder may be easily transported. The hydrogen-producing materials are the solution containing sodium borohydride dissolved in water, and water may be easily obtained. Therefore, a user only needs to transport the sodium borohydride powder without transporting the high pressure cylinders containing hydrogen, so the user does not need to worry about the storage and transporting safety of high pressure cylinders. Hence, transporting cost of hydrogen may be decreased, and safety of storing hydrogen may be enhanced.

Further, the hydrogen production system has an advantage of small size and may be easily set up. Therefore, the hydrogen production system may be directly mounted on a vehicle or at other positions for easily producing hydrogen. Hydrogen does not need to be stored in the high pressure cylinder for transporting.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. A hydrogen production system, comprising:
an automatic feeding device, configured to provide hydrogen-producing materials and to output the hydrogen-producing materials;
a buffer tank, configured to be connected to the automatic feeding device through a first tube;
a first valve, configured to be mounted on the first tube and to receive a first controlling signal from a controlling device; wherein the first valve is turned on or turned off according to the first controlling signal to control whether the hydrogen-producing materials in the automatic feeding device are transported to the buffer tank or not or not transported to the buffer tank;
a main reactor, configured to be connected to the buffer tank through a second tube; wherein the main reactor contains catalyst materials;
a second valve, configured to be mounted on the second tube and to receive a second controlling signal from the controlling device; wherein the second valve is turned on or turned off according to the second controlling signal to control whether the hydrogen-producing materials in the buffer tank are transported to the main reactor or not; wherein when the hydrogen-producing materials in the buffer tank enter the main reactor, the hydrogen-producing materials and the catalyst materials undergo a chemical reaction to produce hydrogen;
a hydrogen storing tank, configured to be connected to the main reactor through a third tube to store the hydrogen;
a one-way check valve, configured to be mounted on the third tube, and to receive a third controlling signal from the controlling device; wherein the one-way check valve is turned on or turned off according to the third controlling signal to control whether the hydrogen in the main reactor is transported to the hydrogen storing tank or not transported to the hydrogen storing tank.

2. The hydrogen production system as claimed in claim 1, wherein a first flow sensor is mounted on the first tube;
wherein the first flow sensor is electrically connected to the controlling device;
wherein the first flow sensor monitors a flow rate of the hydrogen-producing materials flowing from the automatic feeding device to the buffer tank, and transmits a first flow rate signal to the controlling device;
wherein the controlling device controls the first valve to be turned on or turned off according to the first flow rate signal.

3. The hydrogen production system as claimed in claim 2, wherein:
a first temperature sensor is configured to be mounted on the main reactor and to be electrically connected to the controlling device; wherein the first temperature sensor senses a temperature inside of the main reactor, and transmits a first temperature signal to the controlling device according to the temperature inside of the main reactor;

a first pressure sensor is configured to be mounted on the main reactor, and to be electrically connected to the controlling device; wherein the first pressure sensor senses a pressure inside of the main reactor, and transmits a first pressure signal to the controlling device according to the pressure inside of the main reactor;

a second temperature sensor is configured to be mounted on the hydrogen storing tank and to be electrically connected to the controlling device; wherein the second temperature sensor senses a temperature inside of the hydrogen storing tank and transmits a second temperature signal to the controlling device according to the temperature inside of the hydrogen storing tank; and a second pressure sensor is configured to be mounted on the hydrogen storing tank and to be electrically connected to the controlling device; wherein the second pressure sensor senses a pressure inside of the hydrogen storing tank and transmits a second pressure signal to the controlling device according to the pressure inside of the hydrogen storing tank.

4. The hydrogen production system as claimed in claim 3, further comprising:

a pressure relief valve, configured to be mounted on the third tube and to be electrically connected to the controlling device;

wherein the controlling device determines whether the pressure inside of the main reactor reaches a first pressure threshold value according to the first pressure signal, and determines whether the pressure inside of the hydrogen storing tank reaches a second pressure threshold value according to the second pressure signal;

wherein when the pressure inside of the main reactor reaches the first pressure threshold value or the pressure inside of the hydrogen storing tank reaches the second pressure threshold value, the controlling device produces a fourth controlling signal, and outputs the fourth controlling signal to the pressure relief valve to turn on the pressure relief valve to release pressure.

5. The hydrogen production system as claimed in claim 4, further comprising:

a heat exchanger, configured to be mounted on the third tube;

wherein the controlling device determines whether the temperature inside of the main reactor reaches a first temperature threshold value according to the first temperature signal, and determines whether the temperature inside of the hydrogen storing tank reaches a second temperature threshold value according to the second temperature signal;

wherein when the temperature inside of the main reactor reaches the first temperature threshold value or the temperature inside of the hydrogen storing tank reaches the second temperature threshold value, the controlling device controls the heat exchanger to operate.

6. The hydrogen production system as claimed in claim 5, wherein the hydrogen storing tank is connected to a fuel cell through a fourth tube;

wherein a second flow sensor is mounted on the fourth tube, and the second flow sensor is electrically connected to the controlling device;

wherein the second flow sensor monitors a flow rate of the hydrogen flowing from the hydrogen storing tank to the fuel cell, and transmits a second flow rate signal to the controlling device.

7. The hydrogen production system as claimed in claim 6, further comprising:

a waste tank;

a fifth tube, configured to be connected between the main reactor and the waste tank;

a third valve, configured to be mounted on the fifth tube; wherein the third valve is electrically connected to the controlling device;

wherein when the third valve receives a fifth controlling signal from the controlling device, the third valve is turned on, and waste water in the main reactor flows to the waste tank through the third valve.

8. The hydrogen production system as claimed in claim 7, further comprising:

a sixth tube, configured to be connected to the buffer tank, the hydrogen storing tank, and a motor device;

a fourth valve, configured to be mounted on a terminal of the sixth tube connected to the hydrogen storing tank and to be electrically connected to the controlling device;

wherein when the controlling device determines that the pressure inside of the hydrogen storing tank reaches a first setting value according to the second pressure signal, the controlling device transmits a sixth controlling signal to the fourth valve to turn on the fourth valve, and the hydrogen is delivered to the buffer tank from the hydrogen storing tank;

a fifth valve, configured to be mounted on a terminal of the sixth tube connected to the motor device and to be electrically connected to the controlling device;

wherein when the controlling device determines that the pressure inside of the hydrogen storing tank reaches a second setting value according to the second pressure signal, the controlling device transmits a seventh controlling signal to the fifth valve to turn on the fifth valve, and the hydrogen is delivered to the motor device from the hydrogen storing tank.

9. The hydrogen production system as claimed in claim 1, further comprising:

a material feeding tank, configured to contain sodium borohydride powder;

a mixing tank, configured to be connected to the material feeding tank through a seventh tube and to contain the sodium borohydride powder;

a sixth valve, configured to be mounted on a terminal of the seventh tube connected to the material feeding tank and to be electrically connected to the controlling device;

a seventh valve, configured to be mounted on another terminal of the seventh tube connected to the mixing tank and to be electrically connected to the controlling device;

a water feeding tank, configured to be connected to the mixing tank through an eighth tube; wherein the buffer tank contains water and is configured to feed the water to the mixing tank to form the hydrogen-producing materials;

an eighth valve, configured to be mounted on the eighth tube and to be electrically connected to the controlling device;

a third flow sensor, configured to be mounted on the eighth tube and to be electrically connected to the controlling device; wherein the third flow sensor detects a flow rate of the water flowing from the water feeding tank to the mixing tank, and transmits a third flow rate signal to the controlling device;

wherein the controlling device transmits an eighth controlling signal to the sixth valve to control the sixth valve to be turned on, and the sodium borohydride powder in the material feeding tank is fed into the seventh tube and stopped by the seventh valve;

wherein the controlling device controls the sixth valve to be turned off, and transmits a ninth controlling signal to the seventh valve to control the seventh valve to be turned on; wherein the sodium borohydride powder in the seventh tube is fed to the mixing tank;

wherein the controlling device controls the seventh valve to be turned off, and transmits a tenth controlling signal to the eighth valve to control the eighth valve to be turned on;

wherein when the controlling device determines that a volume of the water fed into the mixing tank reaches a predetermined value according to a third flow rate signal detected by the third flow sensor, the controlling device controls the eighth valve to be turned off.

10. The hydrogen production system as claimed in claim 1, further comprising:
- a material feeding tank, configured to contain sodium borohydride powder;
- a mixing tank, configured to be connected to the material feeding tank through a seventh tube and to contain the sodium borohydride powder;
- a sixth valve, configured to be mounted on a terminal of the seventh tube connected to the material feeding tank and to be electrically connected to the controlling device;
- a seventh valve, configured to be mounted on another terminal of the seventh tube connected to the mixing tank and to be electrically connected to the controlling device;
- a water feeding tank, configured to be connected to the mixing tank through an eighth tube; wherein the buffer tank contains water, and is configured to feed the water to the mixing tank to form the hydrogen-producing materials;
- an eighth valve, configured to be mounted on the eighth tube and to be electrically connected to the controlling device;
- a third flow sensor, configured to be mounted on the eighth tube and to be electrically connected to the controlling device; wherein the third flow sensor detects a flow rate of the water flowing from the water feeding tank to the mixing tank, and transmits a third flow rate signal to the controlling device;
- a push device, configured to be mounted on the seventh tube and to push the sodium borohydride powder in the seventh tube out of the seventh tube;

wherein the controlling device transmits an eighth controlling signal to the sixth valve to control the sixth valve to be turned on, and the sodium borohydride powder in the material feeding tank is fed into the seventh tube and stopped by the seventh valve;

wherein the controlling device controls the sixth valve to be turned off, and transmits a ninth controlling signal to the seventh valve to control the seventh valve to be turned on; wherein the sodium borohydride powder in the seventh tube is fed to the mixing tank;

wherein the controlling device controls the seventh valve to be turned off, and transmits a tenth controlling signal to the eighth valve to control the eighth valve to be turned on;

wherein when the controlling device determines that a volume of the water fed into the mixing tank reaches a predetermined value according to a third flow rate signal detected by the third flow sensor, the controlling device controls the eighth valve to be turned off.

* * * * *